Patented Aug. 28, 1951

2,566,146

UNITED STATES PATENT OFFICE 2,566,146

PREPARATION OF VINYL HALIDES

Ferdinand Leonard Schouteden, Wilrijk-Antwerp, and Remi Gustaaf Tritsmans, Mortsel-Antwerp, Belgium, assignors to Gevaert Photo-Producten N. V., Mortsel-Antwerp, Belgium, a company of Belgium No Drawing. Application September 27, 1947, Serial No. 776,626. In the Netherlands October 4, 1946

6 Claims. (Cl. 260—656)

This invention relates to mercury catalysts to be used for instance in the production of vinyl halides from acetylene and hydrogen chloride in gas form, in which the reaction between the gases is furthered by the catalytic action of mercury or mercury salts, of which mercury chloride has proved particularly effective.

The invention relates more specifically to improvements in the production of vinyl halides.

Due to the high volatility of mercury and mercury salts, considerable losses of the catalyst arise at the high temperature at which the reaction occurs, and the activity of the catalyst drops in proportion. This fact and the poisonous character of mercury vapors gave rise to attempts to replace this metal and its salts by others, and compounds of elements of the second and fifth groups of the periodic system, and apart therefrom, compounds of vanadium, aluminum, zinc, and iron have been tried out. However, while these compounds are less volatile, their catalytic effects are inferior to those of mercury salts. The compensation of mercury losses by a systematic addition of fresh mercury or mercury salts during the reaction has been found to be complicated and expensive and not to give favorable results.

We have now found that the losses of mercury substance by volatilization will be reduced and the efficacy of the catalyst will be increased, if the catalyst contains a polymeric substance. The term "polymeric substance" is intended to include polymerisation and polycondensation products as well as co-polymers and co-polycondensation products of different monomers.

Salts of polyacrylic acid, polyvinyl alcohols, polymethacryl amide, polycaprolactam, superpolyamides formed in the reaction between adipic acid and hexamethylene diamine, polyamine resins and the like may be mentioned by way of example.

As to the mercury salts, other metal salts may be admixed to them.

The mixed mercury catalysts, according to this invention, display a considerably lower vapor tension than the plain mercury catalysts hitherto used. This fact was borne out by a series of comparative tests made with equal amounts of solutions of plain mercury salts and mercury salts mixed with monomeric and with polymeric substances, respectively. The following figures denote the percentage of $HgCl_2$ still present after being heated to 150° C. for periods of time ranging from 75 min. to 390 min., the initial quantity of $HgCl_2$ being set at 100.

|   |   | 75 min. | 90 min. | 210 min. | 390 min. |
|---|---|---|---|---|---|
| 1 | $HgCl_2$ (plain) | 25 | 11 | 1 | 0 |
| 2 | $HgCl_2$+methacrylamide | 98 | 87 | 64 | 52 |
| 3 | $HgCl_2$+polymethacrylamide | 86 | 86 | 86 | 86 |
| 4 | $HgCl_2$+caprolactam | 91 | 71 | 25 | 3 |
| 5 | $HgCl_2$+polycaprolactam | 92 | 87 | 61 | 35 |

Besides the reduction of the vapor tension, there results also an increase of the catalytic activity, calculated on the same quantity of the mixture of reacting gases and an equal volume of the catalyst. The yield of vinyl compounds per volume unit of the reaction space filled with the catalyst mass in the furnace is higher without any increase in the percentage of dihalogen compounds formed. While vinyl chloride prepared with a plain mercury catalyst requires thorough washing with caustic alkali before polymerization is started, the reaction mixture, treated according to the present invention, may simply be passed through a water scrubber.

All these advantages are obtained also in other reactions requiring the presence of mercury catalysts.

The solid catalytically active mass may be prepared as a combination of the mercuric salt and the polymeric substance:

1. By mixing a porous granular support with a paste containing the Hg salt and a polymeric substance and, if desired, also another metal salt,
2. By soaking the support in solutions of the catalyst constituents,
3. By forming conglomerates of the paste containing the polymeric substance and the Hg salt,
4. By soaking the polymer itself in a catalytic solution.

The mixture of acetylene and hydrogen chloride may be passed through the catalyst mass under reduced, normal or increased pressure.

The following examples are described as illustrating the use and effect of our invention.

*Example 1.*—100 grams pumice stone are soaked in an aqueous solution containing 1 gram $HgCl_2$ and 5 grams polymethacrylamide. The mass is dried and filled in the reaction furnace, which is then heated to, and held at, a temperature of 150° C. When an equimolar mixture of acetylene and hydrogen chloride gas is then passed through the furnace at the rate of 30 liters per hour, a yield of 195 grams vinylchloride is obtained per hour and liter of catalyst mass. The activity of the catalyst remains the same after 1000 hours of operation.

*Example 2.*—100 grams silica-gel are soaked in a warm 10% solution of HgCl₂. After drying at moderate temperature, the mass is placed in a 10% solution of polycaprolactam in formic acid, is then dried and filled in the reaction furnace, which is held at a temperature of 150–170° C. By passing through it an equimolar mixture of acetylene and hydrogen chloride gas, a yield of 220 grams vinylchloride is obtained per hour and liter of catalyst.

*Example 3.*—100 grams active carbon are soaked in an aqueous solution of superpolyamides produced by reacting adipic acid with hexamethylene diamine. The impregnated carbon mass is freed from the superficially adhering liquid and then placed in a warm solution containing 5 grams HgCl₂ and 10 grams CuCl₂ per liter. After being filled in the furnace, the mass is first heated to 100° C. 175 grams vinylchloride are obtained per hour and liter of catalyst mass.

*Example 4.*—100 grams silica-gel are soaked first in an aqueous solution of HgCl₂ and then in polyvinyl alcohol solution. It is heated in the furnace to 160° C. and a yield of 170 grams vinyl chloride is obtained per hour and liter of catalyst mass.

*Example 5.*—100 grams polyamine resin (ion exchanger) are soaked in a HgCl₂ solution and used in the reaction described in the preceding examples. The yield of vinyl chloride is 165 grams per hour and liter of catalyst mass.

We claim:

1. The process of producing vinyl chloride by the interaction of acetylene with hydrogen chloride gas which comprises conducting the gas mixture at an elevated temperature into contact with a solid catalyst containing mercuric chloride and a solid synthetic polymeric resin.

2. The process of producing vinyl chloride by the interaction of acetylene with hydrogen chloride gas which comprises conducting the gas mixture at an elevated temperature into contact with a solid catalyst containing mercuric chloride and a solid polyvinyl resin.

3. The process of producing vinyl chloride by the interaction of acetylene with hydrogen chloride gas which comprises conducting the gas mixture at an elevated temperature into contact with a solid catalyst containing mercuric chloride and a solid synthetic resin belonging to the group consisting of a polyamide and polycaprolactam.

4. The process of producing vinyl chloride by the interaction of acetylene with hydrogen chloride gas which comprises conducting the gas mixture at an elevated temperature into contact with mercuric chloride and a solid polyvinyl alcohol.

5. The process of producing vinyl chloride by the interaction of acetylene with hydrogen chloride gas which comprises conducting the gas mixture at an elevated temperature into contact with mercuric chloride and a solid polymethacrylic amide.

6. The process of producing vinyl chloride by the interaction of acetylene with hydrogen chloride gas which comprises conducting the gas mixture at an elevated temperature into contact with a solid catalyst containing a mixture of a mercury salt, a copper salt and a solid synthetic polymeric resin.

FERDINAND LEONARD SCHOUTEDEN.
REMI GUSTAAF TRITSMANS.

REFERENCES CITED

The following references are of record in the file of this patent:

UNITED STATES PATENTS

| Number | Name | Date |
|---|---|---|
| 1,999,345 | Stevens | Apr. 30, 1935 |
| 2,042,050 | Hoover | May 26, 1936 |
| 2,322,258 | Strosacker | June 22, 1943 |
| 2,389,626 | Lozier | Nov. 27, 1945 |
| 2,407,039 | Stanley | Sept. 3, 1946 |